United States Patent [19]
Johnsen

[11] Patent Number: 5,413,461
[45] Date of Patent: May 9, 1995

[54] METHOD AND APPARATUS FOR CONTROLLING A PROPULSION ENGINE OUTPUT BASED ON THE NET AXIAL FORCE ON A PROPELLER SHAFT

[76] Inventor: Oddvard Johnsen, Postboks 161, N-3401 Lier, Norway

[21] Appl. No.: 39,200
[22] PCT Filed: Oct. 11, 1991
[86] PCT No.: PCT/NO91/00130
§ 371 Date: Apr. 12, 1993
§ 102(e) Date: Apr. 12, 1993
[87] PCT Pub. No.: WO92/06890
PCT Pub. Date: Apr. 30, 1992

[30] Foreign Application Priority Data
Oct. 12, 1990 [NO] Norway ................................ 904418

[51] Int. Cl.$^6$ .......................... B63H 3/00; B63H 3/06; B63H 21/21
[52] U.S. Cl. ............................................. 416/1; 416/30; 416/35; 416/43; 416/61; 416/25; 416/27; 440/84; 440/87; 114/144 E; 364/431.04; 364/431.05
[58] Field of Search ......................... 416/25, 27, 30, 35, 416/43, 44, 61, 1; 440/84, 87; 114/144 E; 364/431.04, 431.05

[56] References Cited

U.S. PATENT DOCUMENTS

| | | | |
|---|---|---|---|
| 2,279,301 | 4/1942 | Colley et al. ........................ | 416/43 |
| 2,321,381 | 6/1943 | Hammond, Jr. .................... | 416/43 |
| 2,951,543 | 9/1960 | Peterson . | |
| 4,074,648 | 2/1978 | Reid et al. ........................ | 114/144 E |
| 4,246,780 | 1/1981 | Reed . | |
| 4,436,482 | 3/1984 | Inoue et al. ........................ | 416/27 |
| 5,119,304 | 6/1992 | Seki ................................. | 364/431.05 |

FOREIGN PATENT DOCUMENTS

| | | |
|---|---|---|
| 1054253 | 4/1959 | Germany . |
| 0090291 | 6/1982 | Japan ........................ 416/1 |
| 0146796 | 8/1985 | Japan ........................ 114/144 E |
| 345634 | 6/1972 | Sweden . |
| 428792 | 7/1983 | Sweden . |

*Primary Examiner*—Edward K. Look
*Assistant Examiner*—Christopher Verdier
*Attorney, Agent, or Firm*—Jacobson, Price, Holman & Stern

[57] ABSTRACT

A method and apparatus for controlling a propulsion engine output in a vessel, based on the net axial force on a propeller shaft in the vessel. The apparatus includes a regulating loop with a computer which continuously controls the delivery of fuel to the vessel's engine, and optionally controls the attack angle of the vessel's propeller blades. Control of the fuel delivery is performed in accordance with predetermined control algorithms, and optionally, by operator-set parameter values and maneuvering operations. The apparatus further includes at least one force sensor mounted to a bearing which supports the vessel's propeller shaft. The force sensor, which is preferably mounted to a thrust bearing, detects a net axial force on the propeller shaft. The net axial force detected is then used as a parameter in the control algorithms and therefore as a factor in controlling the delivery of fuel. The method involves the steps of monitoring the axial force and using the net axial force as a main parameter for controlling the power output from the vessel's engine to thereby optimize the net axial force in relation to propeller efficiency and economic engine fuel consumption.

13 Claims, 1 Drawing Sheet

METHOD AND APPARATUS FOR CONTROLLING A PROPULSION ENGINE OUTPUT BASED ON THE NET AXIAL FORCE ON A PROPELLER SHAFT

BACKGROUND OF THE INVENTION

The present invention concerns a method and a means for achieving optimum utilization of the propulsion engine of a vessel, and more specifically, optimum operation of a ship's propeller in relation to an economic utilization of fuel, in relation to the cavitation problem (formation of bubbles in metal) on the propeller surface, as well as in relation to increased manoeuvering safety at maximum utilization of the propeller performance.

This principle can be exploited in different manners, e.g. in connection with ships in regular service between harbours, where it is possible to achieve a more precise timing regarding arrival and quay bookings, since an electronically controlled propeller capacity provides the ability for calculating the precise time of arrival (slot time).

In other cases, it may be desirable from a charterer's view that a closer specified "cost price", i.e. average velocity possibly can be determined.

In time chartering, the freight rate will be determined by speed and consumption, i.e. when tonnage can be regarded as equal in other respects, that tonnage will be preferred which can guarantee the lowest consumption of bunker fuel at a certain stated velocity.

In situations of crisis in the form of risk of running aground or danger of collision with other vessels, it is very important to be able to stop the ship as fast as possible. Lately, high speed sea buses appear in increasingly larger numbers in narrow fiords and closed waters where the traffic of ships and small boats is substantial, and it is therefore important to be able to stop the vessel rapidly.

In all cases, the present invention is based upon an optimum utilization of the action of the single propeller blade during motion in water. Under stormy conditions with high waves, the ship will experience a constantly varying resistance to its motion through the water, sometimes with the propeller more or less freely rotating in the air, and with a subsequent variation of the propeller power. The consequence thereof is an engine load with unefficient utilization of the propeller, with a subsequent reduction in speed and possible cavitation of the propeller blade surface on the lee side.

The optimum utilization of the propeller will therefore be closely connected with the ability of the ship to overcome the water resistance during motion.

Traditionally, most ship's propellers in larger ships are moulded in one piece, without any possibility of turning the attack angle of each propeller blade. Smaller vessels have in many cases variable-pitch propellers, however, the development now shows that increasingly larger ships find advantages in using such propeller types with twistable blades.

The construction of a ship is often made on the basis of a predetermined normal velocity, and it is left to the designer in the shipyard to find the most favourable shape of hull and propeller in order to satisfy such a requirement.

The penetration ability of the hull through the water, or expressed inversely, the resistance to the ship's motion, will vary with draught and load. The attack angle of the propeller or the propeller blade in order to achieve optimum efficiency will therefore also vary, so that a fixed, i.e. not variable-pitch propeller must be chosen using an average consideration. Outside this average, the propeller will not provide optimum efficiency. It is therefore clear that a variable-pitch solution is preferable, however, this has clearly been difficult in cases of large dimensions, partly due to cost savings, partly due to causes connected with technological development.

Parameters influencing the propulsion of a ship in water are draught, wave resistance, induced resistance, wind and weather. Of these parameters, draught and induced resistance are given for one single voyage. (In another voyage, another draught may be present). The other parameters, like wave resistance, wind and weather, will vary all the time.

If one takes as a starting point a situation with a given draught and a given velocity, which may represent an optimum working situation, then both an increase and a decrease of the velocity will imply increased total expenses. In the first case, disproportionate amounts of fuel are used (unlinear relation between fuel consumption and velocity), and in addition, engine wear is increased, and also the risk of propeller blade cavitation, with the consequences of increased costs as to maintenance and repair. In the second case (lowered velocity) the results are prolonged time at sea with increased salary expenses, later time of arrival and the consequences due hereto regarding lower possibility of profits.

A variable-pitch propeller is that part of the solution which may be compared to driving a car with manual gear-shift, but a continuously manual "shifting of gears", e.g. in a storm, would be inconceivable. An automatic mechanism would be preferable, in the form of "measuring force in real time".

The best manner in which to utilize the propeller maximally, is to find that balance point for the attack angle of the propeller blades which results in the best utilization of the applied force.

From Swedish laid-open publications no. 345.634 and 350.938 are previously known methods of controlling the load on ship engines in connection with variable-pitch propellers, where the propeller blade attack angle or "pitch" is controlled in relation to the sensed shaft torque, i.e. sensing of the torque on the propeller shaft, while one attempts to maintain the engine rpm at a constant value. Mainly, these systems relate to an overload protection for the engine, and the main point is filtering and delaying of signals in order to avoid too rapid oscillations when adjusting the propeller pitch.

From Norwegian patent no. 152.968 is previously known a method of regulating the engine of a vessel with a variable-pitch propeller, however, in this case control is only effected in relation to measured values of speed, fuel consumption and rpm. There is no direct measurement of the vessel's driving force.

Also, British patent no. 1.200.588 deals with the control of variable-pitch propellers, however, the parameter sensed in the regulating circuit, is only how large a current is delivered to an electric drive motor.

None of these previous publications go to the core of the matter, namely a direct sensing of the force with which the propeller influences the ship at the present moment.

SUMMARY OF THE INVENTION

The present invention aims at providing an improved control system by providing a method and a system for obtaining optimum propulsion of the ship. The invention is defined precisely by means of the appended patent claims.

One attempts with the system and method in accordance with the present invention to obtain the optimum propulsion power, $F_h$, in relation to a predetermined intention.

This is done by finding the optimum rpm or number of revolutions in relation to the attack angle for each propeller blade.

At a given rpm for the propeller, under influence from a given engine power, there is a given attack angle for achieving a given propulsion force $F_h$. Thus, there exists a precise balance between forces.

If an increase of $F_h$ is desirable, it is possible to increase the rpm, or to increase the attack angle with the same engine power, or both these measures can be taken simultaneously.

The purpose of this arrangement is to achieve the best possible $F_h$.

As can be visualized, there is a precise connection between applied engine power or rpm on the shaft, and the twist or the pitch of the propeller blades for finding the most favourable combination for achieving the best possible $F_h$.

This force is most appropriately read directly in the propeller thrust bearing of the vessel. Usually, this bearing is located near the engine. Using the invention, there is achieved a self-tracking towards the optimum propulsion force by measuring this force continuously, i.e. real time measurement of the force $F_h$ for control purposes.

A computer hunts continuously for the presence of a balance between delivered fuel/engine power and the efficiency of the propeller in the form of torque and number of revolutions, i.e. there is at all times an attempt to find an optimum yield of force for the propeller which is read and verifies that the propeller efficiency will be balanced against the ship's velocity and possible external influences. In other words, if it is desirable with the longest possible, or optionally the best possible covered distance per ton of bunker fuel, then the pressure force from the propeller must be controlled in such a manner that the ship moves within this range of optimum performance of propeller/engine.

It should be mentioned that e.g. a fully loaded 100,000 ton vessel with a speed of about 14 knots, consumes about 40 tons of fuel in 24 hours, and that the same ship needs 30/40 minutes or 5/7 nautical miles to stop from full speed with a traditional propeller system. Further, such a ship needs about 40 minutes or 4/6 nautical miles from standstill to full speed when a traditional system is used. This means that an optimum performance propeller can give a substantial contribution both as to increasing safety regarding danger of collision and running aground, and furthermore contributes to an improved fuel economy. The present invention also has the advantage that it will provide optimum operation at all speeds. A system in accordance with the present invention will be able to provide both optimum utilization of the propeller efficiency in economic cruise control, and optimum efficiency during breaking and acceleration.

BRIEF DESCRIPTION OF THE DRAWINGS

The invention shall be described in more detail below, with reference to the drawings, where.

DETAILED DESCRIPTION OF THE PREFERRED EMBODIMENTS

Figure 1:
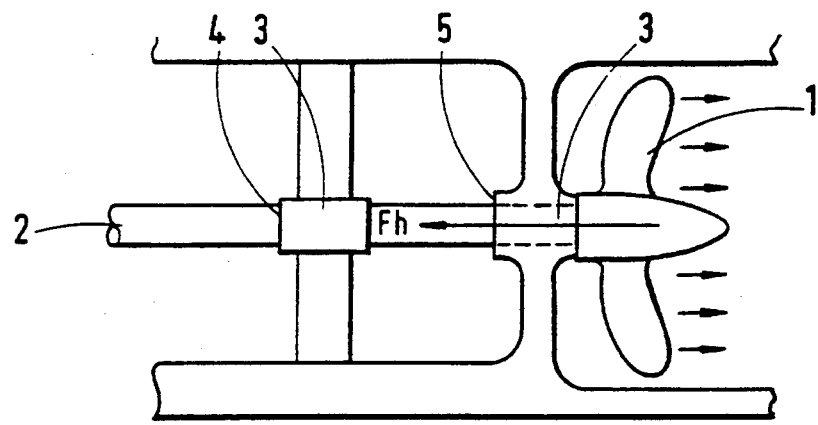
FIG. 1 shows an example of mounting of a force sensor at a ship's propeller shaft.
Figure 2:
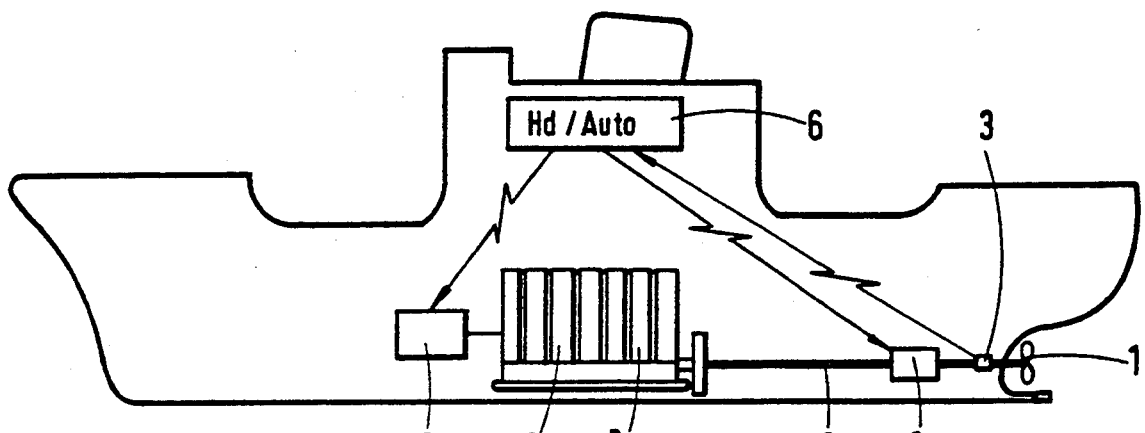
FIG. 2 shows schematically the location of various control elements in the ship, as well as signal paths within the control system.
Figure 3:
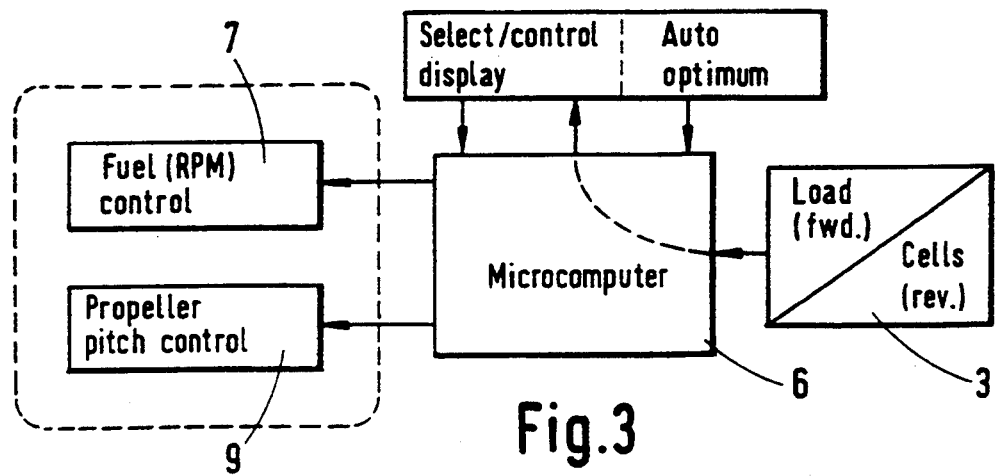
FIG. 3 shows the same as FIG. 2 in the form of a block diagram.

In FIG. 1 is shown the general principle for reading the propulsion force $F_h$ in accordance with the invention. The propeller 1 is visualized as a propeller of the variable-pitch type (but may also be of the type with fixed blades). A load cell 3 (force sensor) reads $F_h$ against the thrust bearing 4 of the propeller shaft 2, forwards and backwards, possibly in the rear sleeve 5 ("stern tube"). The measurement signals from load cell 3 are applied to a computer 6 of the microprocessor type, which in principle executes the following operation, compare FIGS. 2 and 3:

a) successively and with short intervals, the present pressure force from propeller 1, $F_h$, is read/-measured, and is related to the ship velocity, b) the present pressure force, $F_h$, is all the time compared to the engine 8 power $P_m$, and attempts are continuously made via a correction circuit to maintain the optimum attack angle (pitch angle) for each propellor blade, and optionally, the optimum speed of the propellor shaft 2 for achieving optimum pressure force (with variable-pitch propeller blades). For propellers with fixed propeller blades, only the speed of the propeller shaft, i.e. the shaft rpm, will be the determining parameter (approximate optimum operation).

c) The present pressure force $F_h$ is compared to the desired $F_h$ (optimum or pre-set $F_h$, FIG. 3, "Auto-optimum").

d) In accordance with a further defined programme, the detailed description of which should be unnecessary in this specification, the computer controls the fuel control valve 7 which in its turn controls the force output from engine 8, at the same time as the pitch angle (or in the case with fixed blades, the rpm) is varied to optimum or pre-set $F_h$ by means of the propeller pitch control 9.

e) In the case of variable-pitch propeller blades, the computer 6 also controls the number of revolutions (rpm) of shaft 2, so that the propeller does not enter into a stalling situation, with formation of a vacuum adjacent to the propeller blades.

f) The strategy of the programme is as described in the following: As long as a measured $F_h$ is larger than the predetermined value, the attack angle of the propeller blades is lowered (or possibly the rpm in the fixed blade case), and in combination with a decreased fuel delivery, and when large variations occur, also the rpm, even if the propellor is of the variable-pitch type. When $F_h$ is less than the predetermined value, the attack angle of the propeller blades is increased (and possibly also the rpm is increased in the fixed blade case), and in combination also the fuel delivery is increased, and when large variations occur, also the rpm, even if the propellor is of the variable-pitch type. This describes a cycle which starts again and again.

In this manner, there is provided a rapid hunting of and "commuting around" the summit of interest for an optimum utilization of a ship's propeller.

The possibility of using a force sensor 3 mounted in the thrust bearing 5 both for forward and reverse propulsion, was mentioned above, and there should be no problem using "double action" force sensors or load cells. Suitable load cells 3 may exist in many embodiments. For example, strain gauges, semiconductor force sensors or piezoelectric sensors of per se known types may be used.

g) The computer forming the basis of the control loop is adapted in such a manner that the operator, for example the ship's captain, can select a programme (FIG. 3, "Select/control"). This may very well be connected with the ship's navigation system in order to comprise the route structure and the time aspect in addition to the optimum economical operation.

h) The computer has also been fed with all structural limitations, e.g. engine limitations, so that at certain programming choices, the computer limit values which correspond to the structural limitations, will override the operator's programming. A warning system (FIG. 3, "Display") then warns the operator, e.g. that this manoeuvre is not possible due to an excessive exhaust temperature, or that the manoeuvre is executed, however will be limited at maximum exhaust temperature.

There are clear possibilities of a better economic utilization of the fuel in relation to the covered distance. A large ship needs a considerable time and distance in order to reach its cruising speed. Until harmony between the ship's velocity and the propulsive force, $F_h$, has been achieved, a traditionally driven propeller will work outside its optimum working range, and therefore, it will also be prone to cavitation. During braking (reversing), this may happen as a consequence of an emergency stop, i.e. in connection with a risk of collision, running aground etc.

Particularly for high speed passenger vessels in closed waters with heavy traffic, the need of rapid stopping is essential to be able to solve a rapidly arisen situation of crisis. A quick reaction of reversing the propeller is a usual and natural reaction from the shipmaster. The risk of stalling the propeller is then imminent, and is a usual experience. The propeller will only spin without any effect, while the vessel moves rapidly further on.

Clear possibilities exist in this case for using a so-called "panic button" or a selected "Optimum reverse" in the form of a pre-set optimum programme in connection with the present invention.

I claim:

1. A method for achieving optimum utilization of engine power to a vessel's propeller (1) via a solid propeller shaft (2) supported by at least one bearing (4,5), where a computer (6) is used in a regulating loop which continuously controls the power by regulating the number of revolutions of said solid propeller shaft produced per interval of time by the vessel's engine (8), wherein said method comprises the steps of:

monitoring continuously a net axial force exerted longitudinally along the length of said solid propeller shaft (2) using a force sensor (3) mounted on one of said at least one bearing (4,5); and using said net axial force as a main parameter in controlling said power, in such a manner that the net axial force remains optimized in relation to propeller (1) efficiency and economic engine fuel consumption.

2. Method in accordance with claim 1, and where optimization of said net axial force is desirable only to the extent that said power does not exceed a maximum structural limit, and further comprising the steps of:

limiting said power to being below said maximum structural limit, even if pre-set operator instructions require a higher power level; and providing a warning that the pre-set operator instructions are not being carried out whenever said maximum structural limit prevents said pre-set operator instructions from being carried out.

3. Method in accordance with claim 1, and further comprising the step of selecting a program from said computer corresponding to a desired economical operation.

4. Method in accordance with claim 3, wherein said computer (6) is connected to a navigation system of the vessel, said method further comprising the step of using route structure and time as further parameters.

5. A method according to claim 1, wherein said propeller includes propeller blades having an adjustable pitch angle, and wherein said computer used in the regulating loop which continuously controls the power by regulating the number of revolutions, further regulates the pitch angle of the propeller blades, and wherein said step of using the net axial force as a main parameter in controlling said power, includes the step of using said net axial force as a main parameter in regulating the pitch angle of the propeller blades.

6. Method in accordance with claim 5, and where optimization of said net axial force is desirable only to the extent that said power does not exceed a maximum structural limit, and further comprising the steps of:

limiting said power to being below said maximum structural limit, even if pre-set operator instructions require a higher power level; and providing a warning that the pre-set operator instructions are not being carried out whenever said maximum structural limit prevents said pre-set operator instructions from being carried out.

7. Method in accordance with claim 5, and further comprising the step of selecting a program from said computer corresponding to a desired economical operation.

8. Method in accordance with claim 7, wherein said computer (6) is connected to a navigation system of the vessel, said method further comprising the step of using route structure and time as further parameters.

9. An apparatus for achieving optimum utilization of engine power to a vessel's propeller (1) via a solid propeller shaft supported by at least one bearing (4,5), said apparatus comprising a regulating loop with a computer (6) which continuously controls fuel delivery (7) to an engine of the vessel in accordance with predetermined control algorithms, dependent on real time measuring values for at least one physical parameter in addition to the velocity of the vessel, said apparatus further comprising a force sensor (3) mounted on at least one of said at least one bearing (4,5) for providing said at least one physical parameter, said force sensor (3) being adapted for continuously measuring axial forces exerted longitudinally along the length of said solid propeller shaft (2).

10. Apparatus in accordance with claim 9, wherein said at least one of said at least one bearing is a thrust bearing of the solid propeller shaft, said force sensor (3) being mounted on the thrust bearing (4).

11. An apparatus in accordance with claim 9, wherein said propeller includes propeller blades having an adjustable pitch angle, and wherein said computer further controls the pitch angle of the propeller blades in accordance with said predetermined control algorithms.

12. An apparatus in accordance with claim 11, wherein said computer further controls the pitch angle of the propeller blades in accordance with operator-set parameter values.

13. An apparatus in accordance with claim 9, wherein said computer further controls the fuel delivery to the engine of the vessel in accordance with operator-set parameter values.

* * * * *